United States Patent
Matsumoto

Patent Number: 5,999,165
Date of Patent: Dec. 7, 1999

[54] THREE-DIMENSIONAL DISPLAY SYSTEM

[75] Inventor: Hiroshi Matsumoto, Tokyo, Japan

[73] Assignee: NEC Corporation, Tokyo, Japan

[21] Appl. No.: 08/824,542

[22] Filed: Mar. 26, 1997

[30] Foreign Application Priority Data

Mar. 27, 1996 [JP] Japan .................................. 8-072879

[51] Int. Cl.$^6$ .................................................. G06F 3/033
[52] U.S. Cl. ........................ 345/157; 345/355; 345/419
[58] Field of Search .................................. 345/145, 157, 345/156, 163, 146, 139, 419, 426, 355; 364/439, 413.22, 414; 340/709

[56] References Cited

U.S. PATENT DOCUMENTS

| | | | |
|---|---|---|---|
| 4,674,046 | 6/1987 | Ozeki et al. | 364/414 |
| 4,766,423 | 8/1988 | Ono et al. | 340/709 |
| 4,812,829 | 3/1989 | Ebina et al. | 340/709 |
| 4,823,272 | 4/1989 | Inselberg | 364/461 |
| 4,833,462 | 5/1989 | Gover et al. | 340/709 |
| 4,835,528 | 5/1989 | Flinchbaugh | 340/709 |
| 4,868,766 | 9/1989 | Oosterholt | 364/522 |
| 5,083,287 | 1/1992 | Obata et al. | 395/126 |
| 5,264,836 | 11/1993 | Rubin | 345/157 |
| 5,339,085 | 8/1994 | Katoh et al. | 342/180 |
| 5,371,778 | 12/1994 | Yanof et al. | 364/413.22 |
| 5,528,735 | 6/1996 | Strasnick et al. | 395/127 |
| 5,561,445 | 10/1996 | Miwa et al. | 345/163 |
| 5,574,648 | 11/1996 | Pilley | 364/439 |

FOREIGN PATENT DOCUMENTS

| | | |
|---|---|---|
| 4-267427 | 9/1992 | Japan . |
| 06-195436 | 7/1994 | Japan . |
| 05-250777 | 9/1994 | Japan . |

*Primary Examiner*—Matthew Luu
*Assistant Examiner*—Jeff Piziali
*Attorney, Agent, or Firm*—Foley & Lardner

[57] ABSTRACT

A three-dimensional display system for displaying a three-dimensional object on a two-dimensional screen, wherein three semi-transparent X, Y and Z cursor planes are moved on the display screen in consistency with a moving operation of a pointing device. A cursor symbol is displayed at a cross point of the cursor plane. When an object symbol is present in either front or rear of the cursor plane, its luminance and display color are changed so as to recognize relationship between the object symbol and the cursor plane visually. The object symbol is projected on the Y cursor plane to show a Y projection object symbol, enabling to recognition of the altitude of the object symbol. The object symbol is further projected on the Z cursor plane and a reference plane to obtain a Z projection object symbol and a reference projection object symbol, resulting in recognizing the planar position of the object symbol. "The object symbol is further projected on the X and Y cursor planes." As a result, the position of the three-dimensional object displayed in the three-dimensional manner and the positional relationship between the object symbol and the cursor symbol can be exactly recognized.

8 Claims, 3 Drawing Sheets

THREE-DIMENSIONAL DISPLAY SYSTEM

BACKGROUND OF THE INVENTION

The present invention relates to a three-dimensional display system for displaying a position of a three-dimensional object on a two-dimensional screen such as a cathode ray tube or the like using three-dimensional graphic processing.

DESCRIPTION OF THE PRIOR ART

A conventional system for displaying a position of a three-dimensional object, such as a console (PPI (plan position indication) display) of an air traffic control system, displays an airplane position as a three-dimensional object on a two-dimensional screen.

FIG. 1 shows two-dimensional positions of airplanes in an air traffic control system.

In the two-dimensional display shown in FIG. 1, when showing the positional coordinates of airplanes, one positional point projected on the surface of the ground is represented by a target symbol 201. The altitude information of the airplane is shown buy altitude data 202 and its identifying information by identification data 203.

A selection operation of a certain airplane from displays of a plurality of airplanes, that is, a hook operation is executed by moving a cursor symbol 204 to the vicinity of the target symbol 201 of the airplane to be selected using a pointing device such as a trackball and then pushing down a switch for instructing the hook. The hooked airplane is adapted to be observed by, for example, flashing the target symbol 201 on the display screen.

On the other hand, in a conventional design system using a computer (CAD system), a three-dimensional object is displayed using a three-dimensional graphic system. In this CAD system, one known example of a partial indication system of the three-dimensional nature of the object to be manipulated is a cursor symbol which picks up the object along with the cursor symbol.

Further, another partial indication system of a three-dimensional object to be manipulated has been proposed as "Three-dimensional Cursor Display System" disclosed in Japanese Patent Laid-Open Publication No. 4-267427. In this conventional system, indication and display are carried out using a three-dimensional display cursor. When Z-axis coordinates of a cursor are coincident with, or close to, Z-axis coordinates on a three-dimensional object, the display attribute of this part is changed, resulting in readily proving the depth position of the cursor on the display screen.

However, in the foregoing conventional three-dimensional display system, a partial coordinate value of the three-dimensional object, for example, in the case of the airplane, altitude data is displayed in numeric value. Hence, the position of the airplane is required to be known. In this case, from the display position of the target symbol and its altitude data, a controller is required to imagine its three-dimensional space. In other words, in the display system of a three-dimensional object in a two-dimensional manner, the three-dimensional position of the three-dimensional object can not be visually recognized.

In the three-dimensional display, a three-dimensional space is projected on a two-dimensional screen, and the position of the displayed object is liable to be erroneously recognized due to an illusion. Hence, when a three-dimensional object is displayed in a three-dimensional manner, positions of an object symbol and a cursor symbol can not be precisely recognized.

SUMMARY OF THE INVENTION

It is therefore an object of the present invention to provide a three-dimensional display system in view of the aforementioned disadvantages of the prior art, which is capable of implementing precise recognition of a position of a three-dimensional object displayed in a three-dimensional manner and positions of an object symbol and a cursor symbol when carrying out a three-dimensional display of a three-dimensional object.

In accordance with one aspect of the present invention, there is provided a three-dimensional display system for displaying a three-dimensional object on a two-dimensional screen, comprising managing means for managing graphic information of an object symbol representing the position of the three-dimensional object; transformation means for transforming the graphic information into screen display information so as to display the object symbol on a display screen; first memory means for storing color information of pixels of the display screen in advance; drawing means for writing the color information stored in the first memory means into the screen display information to obtain second screen display information; and second memory means for storing the second screen display information.

Preferably, the three-dimensional display system further comprises producing means for producing graphic information for displaying a semi-transparent cursor plane on the display screen in consistency with a movement operation of a pointing device and graphic information for displaying a cursor symbol at a cross point of the cursor plane.

The three-dimensional display system can further comprise change means for changing luminance and display color of the object symbol when the object symbol is positioned in either front or rear of the cursor plane.

The producing means further produces graphic information for displaying images obtained by projecting the object symbol on a cursor plane and a reference plane.

A three-dimensional display system can be applied to an image display system of an air traffic control system and a CAD system.

In the three-dimensional display system, the object symbol indicating the position of the three-dimensional object is displayed in the three-dimensional manner, and the three-dimensional position of the object symbol can be exactly recognized visually.

The cursor plane is displayed in a semi-transparent manner with the cursor symbol displayed at the cross point of the cursor, and the luminance and display color of the object symbol are changed depending on its position in either front or rear of the cursor plane. Hence, the position of the cursor plane and the positional relationship between the cursor symbol and the object symbol can be exactly recognized visually.

The object symbol is projected on the cursor plane or the reference plane to display its image thereon, and the position of the object symbol can be exactly recognized.

In the three-dimensional display system which is applied to an air traffic control system and a CAD system, the three-dimensional position of the object symbol can be exactly recognized visually, and the position of the cursor plane and the positional relationship between the cursor symbol and the object symbol can be exactly recognized visually.

BRIEF DESCRIPTION OF THE DRAWINGS

The objects, features and advantages of the present invention will become more apparent from the consideration of the following detailed description, taken in conjunction with the accompanying drawings, in which.

DESCRIPTION OF THE PREFERRED EMBODIMENTS

Figure 1:
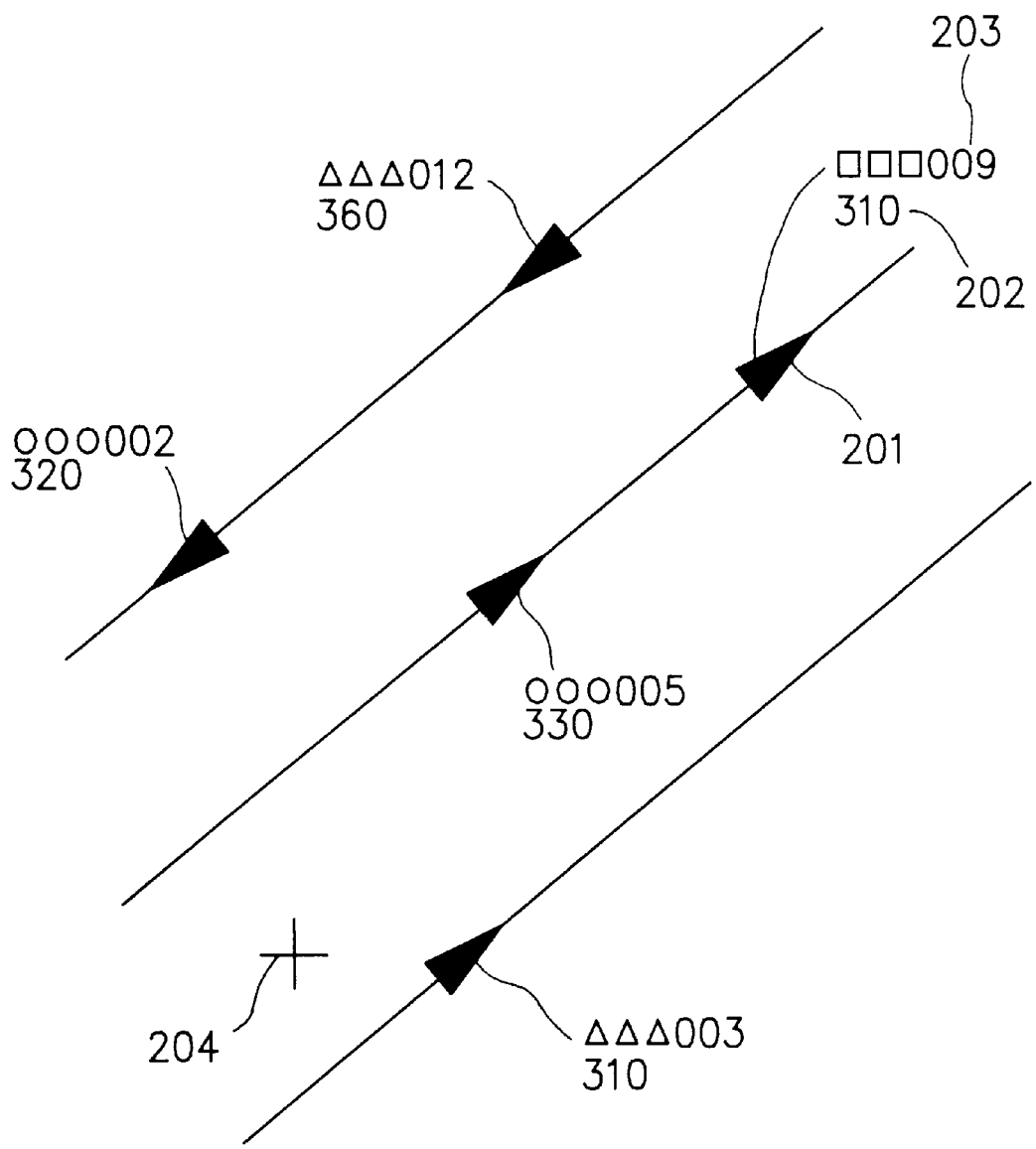
FIG. 1 is a schematic diagram showing two-dimensional positions of airplanes in an air traffic control system.
Figure 2:
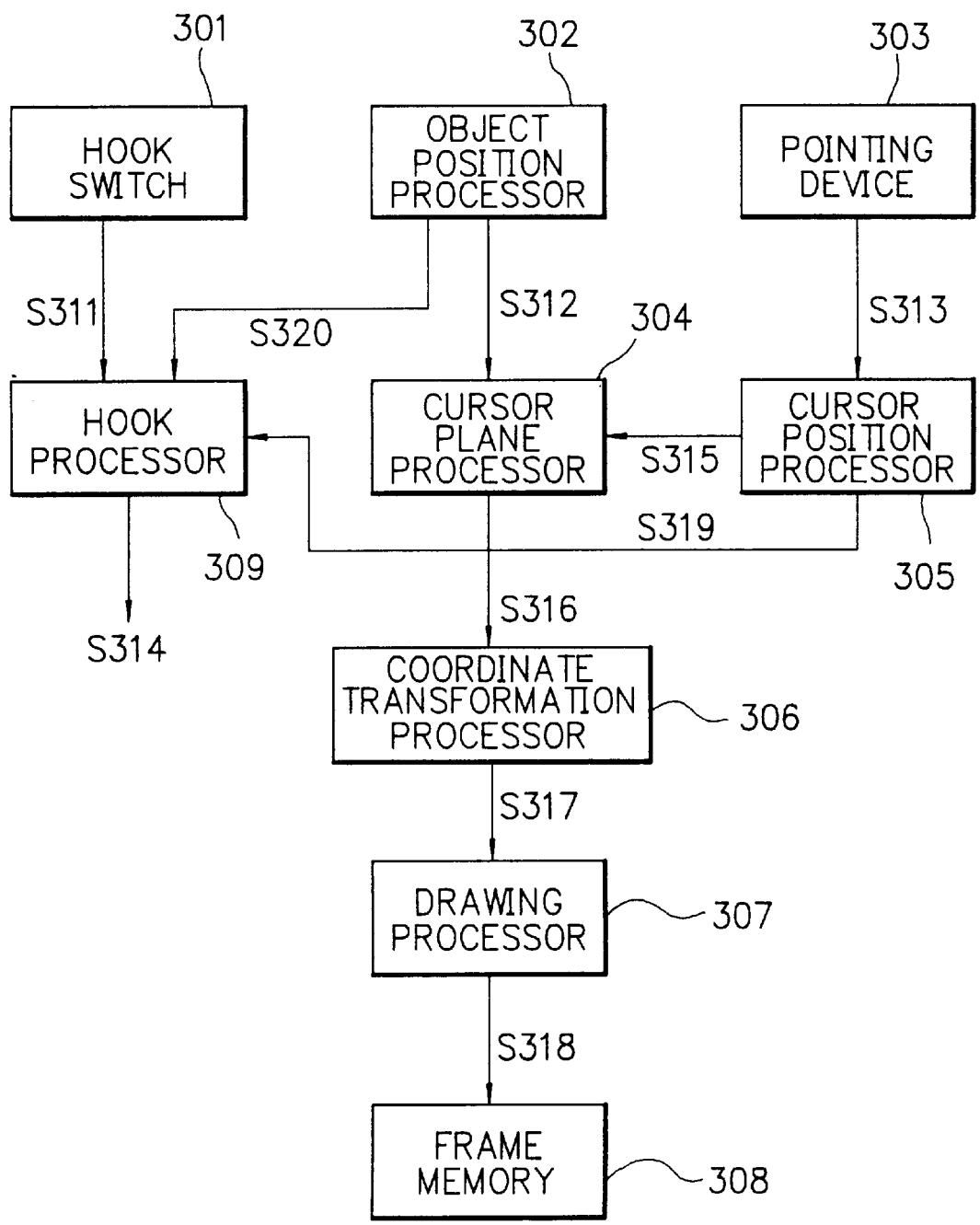
FIG. 2 is a block diagram of a three-dimensional display system according to one embodiment of the present invention.

Referring now to the drawings, there is shown in FIG. 2 a three-dimensional display system according to one embodiment of the present invention.

As shown in FIG. 2, in the three-dimensional display system, a hook switch 301 carries out a hook indication to output a hook indication S311 to a hook processor 309. An object position processor 302 manages position information of object symbols and outputs object graphic information S312 representing a graphic form exhibiting object symbols and its display position to the hook processor 309 and a cursor plane processor 304.

A pointing device 303 executes a pointing operation to output displacement information S313 to a cursor position processor 305 for outputting cursor plane position information S315 and cursor position information S319 on the basis of the displacement information S313. The cursor plane processor 304 outputs three-dimensional graphic information S316 to a coordinate transformation processor 306 in order to display a semi-transparent cursor plane in the position indicated by the cursor plane position information S315 sent from the cursor position processor 305.

The coordinate transformation processor 306 outputs device screen information S317 to a drawing processor 307 on the basis of the three-dimensional graphic information S316 fed from the cursor plane processor 304. The drawing processor 307 writes color display information for pixels of the display screen into a frame memory 308 on the basis of the device screen information S317 sent from the coordinate transformation processor 306. The frame memory 308 stores the color display information for the pixels of the display screen. The hook processor 309 searches the object symbol on the basis of the hook indication S311 sent from the hook switch 301 to output the search result as hook information S314.

Next, the operation of the three-dimensional display system described above will be described in detail.

In FIG. 2, in the object position processor 302, the position information of the object symbol is managed and the graphic forms representing the object symbol and its display positions are transfered as the object graphic information S312 to the cursor plane processor 304.

In the cursor position processor 305, the position coordinates of the cursor plane are changed on the basis of the displacement information S313 sent from the pointing device 303 and the position coordinates of the cursor plane are output as the cursor plane position information S315 to the cursor plane processor 304. Further, the position coordinates of the cross point of the cursor plane are output as the cursor position information S319 to the hook processor 309.

In the cursor plane processor 304, the graphic information for displaying the semi-transparent cursor plane in the position indicated by the cursor plane position information S315, the graphic information for displaying the cursor symbol at the cross point of the cursor plane, the graphic information of the object symbol supplemented by information of luminance and display color based on the relationship between the object symbol and the cursor plane, and the graphic information for displaying images obtained by projecting the object symbol on the cursor plane and a reference plane are output as the three-dimensional graphic information S316 to the coordinate transformation processor 306.

In the hook processor 309, in response to the hook indication S311 fed from the hook switch 301, the object symbol close to the coordinates shown by the cursor position information S319 is searched from the object position information S320 sent from the object position processor 302 and this search result is output as hook information S314.

The coordinate transformation processor 306 inputs the three-dimensional graphic information S316, executes a transformation process in order to display the three-dimensional graphics on a two-dimensional screen, and outputs the transformation result as device screen information S317 to the drawing processor 307.

The frame memory 308 stores the display color information of the pixels of the display screen, and the drawing processor 307 writes the display color information of the pixels into the frame memory 308 on the basis of the device screen information S317.

Figure 3:
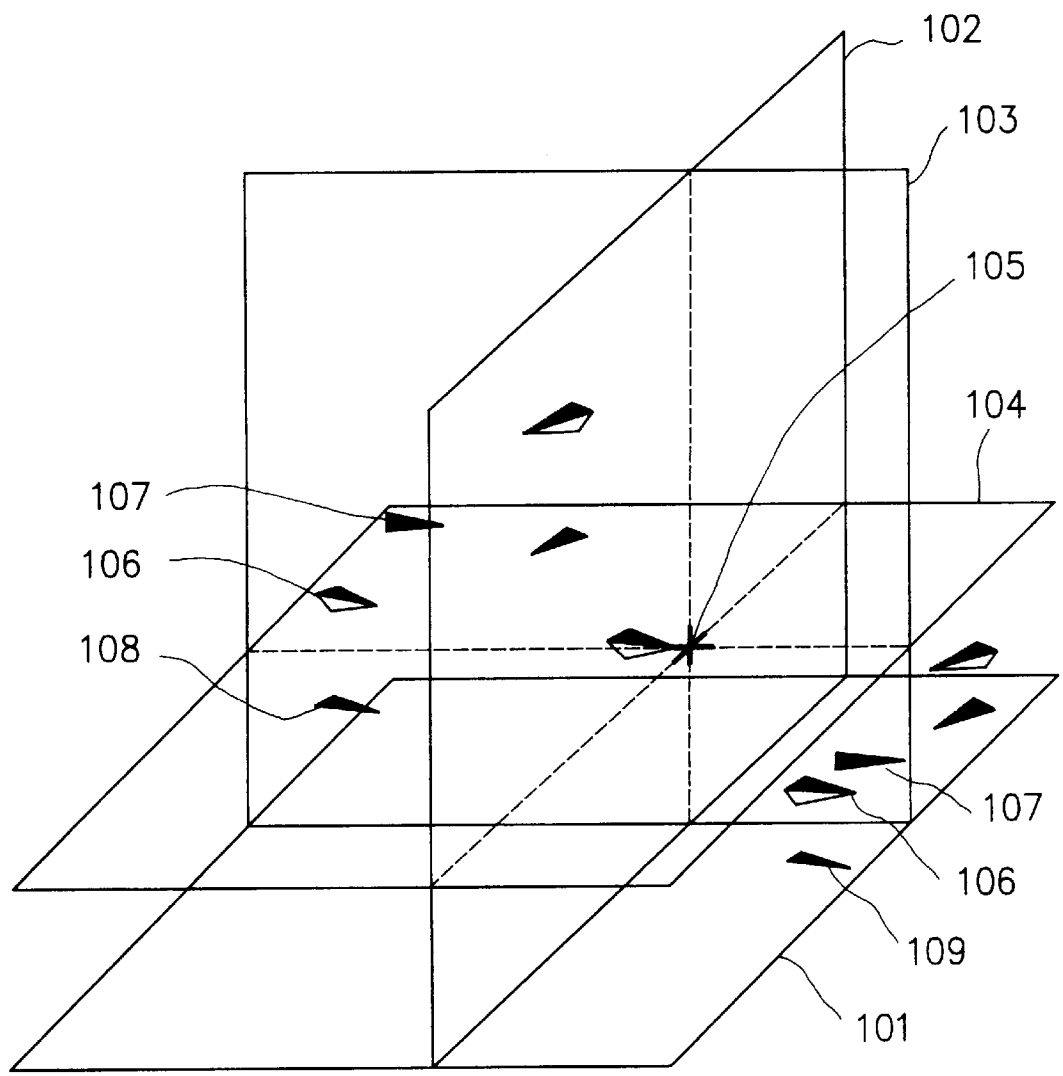
FIG. 3 is a schematic perspective view of a display screen when the three-dimensional display system shown in FIG. 2 is applied to a position display of airplanes.

FIG. 3 shows a display screen when the three-dimensional display system shown in FIG. 2 is applied to a position display of airplanes.

In FIG. 3, the reference plane 101 represents an imaginary plane at a predetermined altitude and a position of an airplane above the reference plane 101 is indicated by an object symbol 106.

On this display surface, three semi-transparent cursor planes, that is, X cursor plane 102, Y cursor plane 103 and Z cursor plane 104 move in consistency with a moving operation of a pointing device, and a cursor symbol 105 is shown at the point crossing the three cursor planes.

When the object symbol 106 is present in front or rear of the cursor plane, its luminance and display color are changed. As a result, the positional relationship between the object symbol 106 and the cursor plane can be exactly recognized visually.

The object symbol 106 is projected onto the Y cursor plane 103 to exhibit a Y projection object symbol 107. Hence, the altitude of the object symbol 106 can be exactly known. When the object symbol 106 is projected onto the X cursor plane 102, a similar effect can be obtained.

The object symbol 106 is projected onto the Z cursor plane 104 to show a Z projection object symbol 108, and further onto the reference plane 101 to obtain a reference projection object symbol 109. As a result, the planar position of the object symbol 106 can be exactly recognized.

As described above, in a three-dimensional display system according to the present invention, an object symbol representing a three-dimensional object such as an airplane is shown in a three-dimensional manner such as three different X, Y and Z planes and hence the three-dimensional position of the object symbol can be exactly recognized visually.

The cursor plane is displayed in a semi-transparent manner with the cursor symbol displayed at the cross point of the cursor, and the luminance and display color of the object symbol are changed depending on its position in either front or rear of the cursor plane. Hence, the position of the cursor plane and the positional relationship between the cursor symbol and the object symbol can be exactly recognized visually.

The object symbol is projected on the cursor plane or the reference plane to display its image thereon, and the position of the object symbol can be exactly recognized.

In the three-dimensional display system which is applied to an air traffic control system and a CAD system, the three-dimensional position of the object symbol can be exactly recognized visually, and the position of the cursor plane and the positional relationship between the cursor symbol and the object symbol can be exactly recognized visually.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A three-dimensional display system for displaying a three-dimensional object on a two-dimensional screen, comprising:

managing means for managing graphic information of an object symbol representing the position of the three-dimensional object;

transformation means for transforming the graphic information into screen display information so as to display the object symbol on a display screen;

first memory means for storing color information of pixels of the display screen in advance;

drawing means for writing the color information stored in the first memory means into the screen display information to obtain second screen display information;

second memory means for storing the second screen display information; and producing means for producing graphic information for displaying a semi-transparent cursor plane on the display screen in consistency with a movement operation of a pointing device and graphic information for displaying a cursor symbol at a cross point of the cursor plane.

2. A three-dimensional display system of claim 1, further comprising change means for changing luminance and display color of the object symbol when the object symbol is positioned in either front or rear of the cursor plane.

3. A three-dimensional display system of claim 1, wherein the producing means further produces graphic information for displaying images obtained by projecting the object symbol on a cursor plane and a reference plane.

4. A three-dimensional display system of claim 1, wherein the system is applied to an image display system of an air traffic control system and a CAD system.

5. A three-dimensional display system of claim 2, wherein the system is applied to an image display system of an air traffic control system and a CAD system.

6. A three-dimensional display system of claim 3, wherein the system is applied to an image display system of an air traffic control system and a CAD system.

7. A three-dimensional display system for displaying a three-dimensional object on a two-dimensional screen, comprising:

managing means for managing graphic information of an object symbol representing the position of the three-dimensional object;

transformation means for transforming the graphic information into screen display information so as to display the object symbol on a display screen;

first memory means for storing color information of pixels of the display screen in advance;

drawing means for writing the color information stored in the first memory means into the screen display information to obtain second screen display information;

second memory means for storing the second screen display information; and producing means for producing graphic information for displaying a semi-transparent cursor plane on the display screen in consistency with a movement operation of a pointing device and graphic information for displaying a cursor symbol at a cross point of the cursor plane, wherein the producing means may display three semi-transparent cursor planes.

8. A three-dimensional display system of claim 7, wherein the three semi-transparent cursor planes are X, Y, and Z planes.

* * * * *